Jan. 11, 1966    J. A. BRADNER    3,228,111
LEAD CHECKING AND MEASURING MEANS
Filed Sept. 17, 1962    9 Sheets-Sheet 1

Fig. 1

INVENTOR.
John A. Bradner
BY
Andrew H. Van Horn
Atty

Jan. 11, 1966    J. A. BRADNER    3,228,111
LEAD CHECKING AND MEASURING MEANS
Filed Sept. 17, 1962    9 Sheets-Sheet 5

Fig. 5

INVENTOR.
John A. Bradner
BY
James A. Van Horn
Atty

Jan. 11, 1966 J. A. BRADNER 3,228,111
LEAD CHECKING AND MEASURING MEANS
Filed Sept. 17, 1962 9 Sheets-Sheet 6

INVENTOR.
John A. Bradner
BY
Andrew H. Van Horn
Atty

| LEAD | $D_3$ | $D_6$ | $D_7$ | $D_7/D_6$ |
|---|---|---|---|---|
| 1/4 | 2.0000 | | | |
| 3/8 | 3.0 | | | |
| 1/2 | 4. | | | |
| 5/8 | 5. | 5.000 | 1.8750 | 3/8 |
| 3/4 | 6. | | | |
| 7/8 | 7. | | | |
| | | | | |
| 1 | 2.0000 | | | |
| 1 1/8 | 2.2500 | | | |
| 1 1/4 | 2.500 | | | |
| 1 3/8 | 2.75 | | | |
| 1 1/2 | 3.0 | | | |
| 1 5/8 | 3.25 | 2.000 | 3.000 | 3/2 |
| 1 3/4 | 3.5 | | | |
| 1 7/8 | 3.75 | | | |
| 2 | 4. | | | |
| 2 1/2 | 5. | | | |
| 3 | 6. | | | |
| 3 1/2 | 7. | | | |

$D_3 = 8 \times \text{LEAD}$ (top group)

$D_3 = 2 \times \text{LEAD}$ (bottom group)

CONSTANT DISCS — $D_1 = 4.000$
$D_2 = 3\pi 9.4248$
$D_4 = 8.000$
$D_5 = 2.000$

LEAD FORMULA: $\frac{D_1}{D_2} \times \frac{D_3}{D_4} \times \pi D_5 \times \frac{D_7}{D_6} = \frac{D_5}{3} \times \frac{D_7}{D_6} = \text{LEAD}$

FIG. 16

United States Patent Office 3,228,111
Patented Jan. 11, 1966

3,228,111
LEAD CHECKING AND MEASURING MEANS
John A. Bradner, Cleveland, Ohio, assignor to The Lees-Bradner Company, Cleveland, Ohio, a corporation of Ohio
Filed Sept. 17, 1962, Ser. No. 224,122
5 Claims. (Cl. 33—179.5)

The present invention relates to means for checking, testing and/or measuring the lead and accuracy of a helix and more particularly is directed to such a means by which deviations between the helical form in the workpiece and the true and calculated trace made by the machine may be visually indicated and recorded if desired.

It is an object of this invention to check and measure the accuracy of a helix or lead of a helix and to thus detect and indicate any non-uniformity by measuring the surface linearly along the axis of a threaded or otherwise helically grooved cylindrical part in timed relation with the rotation of the part.

Another object of this invention is the provision of means for accurately measuring the lead of a helix for detecting deviations therein by friction means thereby eliminating the use of gears, tapes and similar devices which will not provide a high degree of accurate measurement due to backlash or the like.

Another object of this invention is in means of the kind defined which employs means including friction disks and bars in which one of the disks is to a pi diameter or multiples thereof for easy calculations of ratios to limit the need for only one such disk in the mechanism.

A further object of this invention is a mechanism of the type described which can easily be set up to measure linearly in terms of exactly one revolution of the workpiece being treated or checked.

A still further object of this invention is to make continuous measurements along a workpiece having threads or grooves whereby "drunkenness" or lack of uniformity in the lead is easily detected and can easily be measured, thus eliminating intermittent or pitch-to-pitch measurement.

Still another object of this invention is to accurately measure the accuracy of a helix dynamically.

Another object is to accurately measure a helix on workpieces having widely varying leads.

Another object resides in an apparatus of the above defined type by which the accuracy of a helix may be measured with a high degree of precision.

Another object is to measure the lead of a screw thread, or screw like form or groove of a workpiece by rotating the piece in a support and converting this rotary motion of the piece into accurate linear motion of a member in timed relation and in a direction parallel with the axis of the helix to be measured, and by providing suitable means such as a probe or stylus supported on the linearly movable member for contact with the thread or groove of the piece for measuring the deviation or trueness of the lead thereof, and to indicate and/or record such measurement.

Still another object of this invention is to measure linearly along the axis of a threaded or otherwise helically grooved cylinder part in timed relation with the rotation of the part and to provide means to accomplish the same by transmitting precise motion through change of direction, around corners defining angles acute, square or obtuse by the provision of two accurate bars disposed at a selected angle one to the other and by transmitting motion from one bar to the other by a multiplicity of rotating members mounted on a common axis.

Still another object of this invention resides in eliminating the need of a moving probe from one thread-to-another along a helically grooved piece by micrometer or gauge block measurement and the like, thus materially speeding up the measurement of the lead of a helix by employing the present invention, as distinguished from intermittent or thread-to-thread type measurement.

A further object is to provide means of the type described employing disks of pi or multiples thereof for easy and rapid calculations of ratios in checking workpieces having different leads.

Other objects and advantages of this invention will become more apparent as the following description of an embodiment thereof progresses, reference being made to the accompanying drawing in which like reference characters are employed to designate like parts throughout the same.

In carrying out my invention, I have illustrated an embodiment thereof in the drawings by which the objects hereinbefore set forth may be achieved. It is understood that while I have illustrated and will describe below a construction which is effective to check and measure the accuracy of a helix and hence the lead of that helix for accuracy and precision which may be indicated for running a visual observation and/or which may be recorded as a permanent record, this disclosure is not to be construed as limiting the structure to that shown in the drawing or described below since changes and modifications may be made in the structure without departing from the spirit of the invention or the scope of the claims hereinafter appended. The apparatus and its operation illustrated in the drawings may be described as follows:

As shown, the apparatus or machine preferably is of the bench type and is mounted upon a bed or support 1 in the upper surface of which a prismatic groove 2 is disposed longitudinally of the bed or support and carries within it a precision cylinder way 3 secured in place in the groove by any suitable means. An inverted complementary prismatic groove 4 is provided in the base of the headstock 5 and receives the upper portion of the cylinder way 3, as indicated more clearly in FIGURE 4. The tailstock 6 is provided with a similar inverted prismatic groove which receives the opposite end portion of the way 3 to permit movement of the tailstock as desired longitudinally of the bed and along the way 3 in such a way that proper alignment between the headstock and tailstock is assured at all positions of the tailstock 6.

Figure 1:
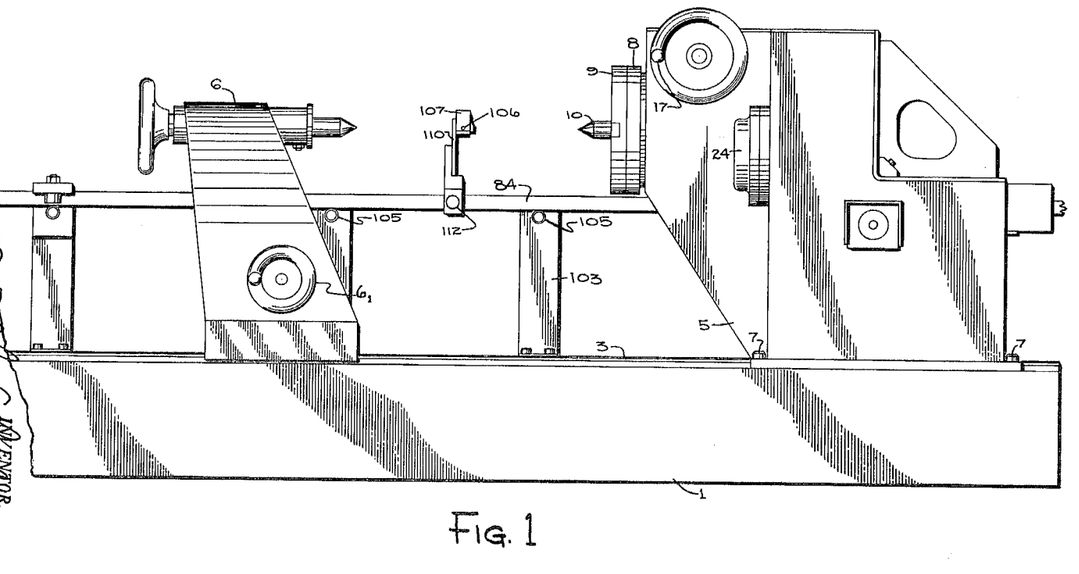
FIGURE 1 is a side elevation of a machine to which the present invention is applied.
Figure 2:
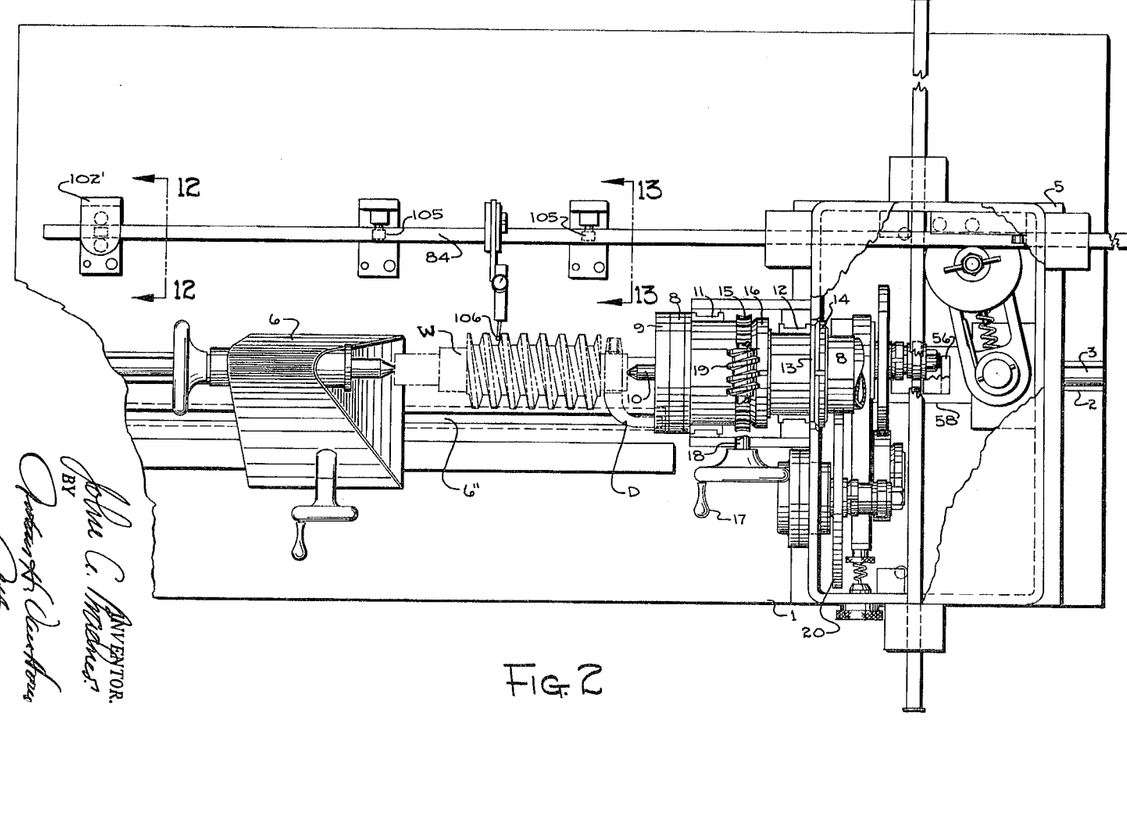
FIGURE 2 is a top plan view of a machine such as that shown in FIGURE 1 and showing a workpiece supported therein, the headstock cover of the machine being broken away in part.

The tailstock may be clamped to the bed by means of the handwheel 6' which in turn operates an inverted T-headed bolt or the like (not shown) which may be slidably engaged with the T slot in bed 1, as can be seen at 6" in FIGURE 2.

The headstock 5 is secured in fixed position on the bed 1 by a plurality of bolts 7 and rotatably carries a work spindle 8, an adapter 9 and a center 10, or other tool such as a conventional chuck or the like may be employed to hold and drive the work to be tested either in conjunction with or without the tailstock 6.

As is illustrated in FIGURE 2, the work spindle 8 is journalled in bearings 11 and 12 and is maintained in proper axial position within the bearings by the spacer 13 and nut 14 threaded on the spindle. A worm wheel 15 is keyed and fixed to the work spindle and is retained in position by means of a nut 16.

A handwheel 17 is carried on one end of a shaft 18 which carries a worm 19, all mounted in a transverse direction across the spindle, the worm 19 having meshing engagement with the worm wheel 15 so that rotation of the handwheel 17 and shaft 18 will rotate the spindle and the workpiece W carried thereby. In the illustration shown in FIGURE 2, the workpiece W is mounted between centers in the headstock and tailstock and rotary motion of the spindle is imparted to the workpiece by means of a dog D having engagement with the workpiece or its support and with the adapter 9.

Figure 8:
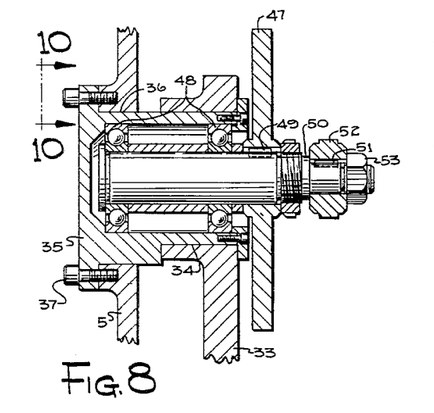
FIGURE 8 is a sectional view taken along line 8—8 of FIGURE 4.

The rear portion of the work spindle 8 is in frictional driving contact with a friction disk 20 which is keyed to shaft 21 journalled in bearing 22 in bore 23 eccentric to the outside diameter of cartridge 24. The cartridge 24 is rotatably adjustable and is held by bolts 25 in bore 26 of the headstock 5. This is clearly illustrated in FIGURES 2 and 9. Rotation of the disk 20 which is keyed at 27 to shaft 21 will transmit rotary motion through key 28 to the disk 29 which is removably mounted on the end of the shaft 21 by means of a nut 30. The disk 29 is of a selected pi or multiple thereof for easy calculation of ratios with the associated rotary friction disks in the drive. Rotation of the disk 29 is frictionally transmitted through the idler disk 31 which in turn transmits this motion frictionally to the idler disk 32. The arm 33 which is shown more clearly in FIGURES 4 and 5 is provided with slide ways slidably accommodating the idler disks 31 and 32 and this arm is pivotally mounted on a diameter as at 34 of the cartridge 35 which is supported in the opening 36 of the headstock 5 (FIGURE 8).

Figure 9:
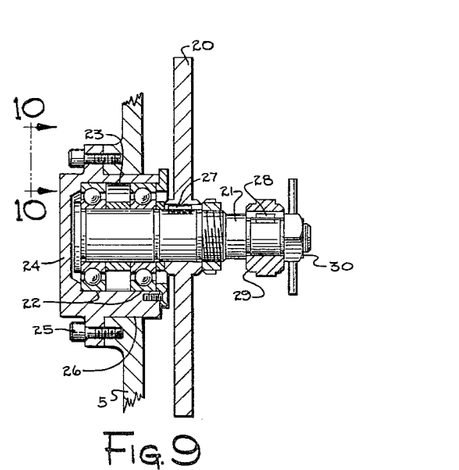
FIGURE 9 is a section taken on line 9—9 of FIGURE 4 in the direction of the arrows.
Figure 10:
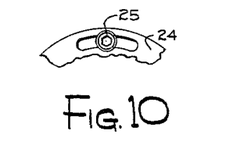
FIGURE 10 is a fragmentary end view taken on the line 10—10 of FIGURE 8.

Cartridge 35 is adjustably and rotatably positionable in and secured to the headstock 5 by means of bolts 37. In this connection, FIGURE 10, both of the cartridges 24 and 35 are provided with elongated slots through which the bolts pass permitting rotatable adjustability with respect to the bolts which hold these cartridges in place. FIGURES 8 and 9, respectively, illustrate the cartridges 35 and 24, and the rotatable adjustability of these respective parts with respect to the headstock 5.

Figure 4:
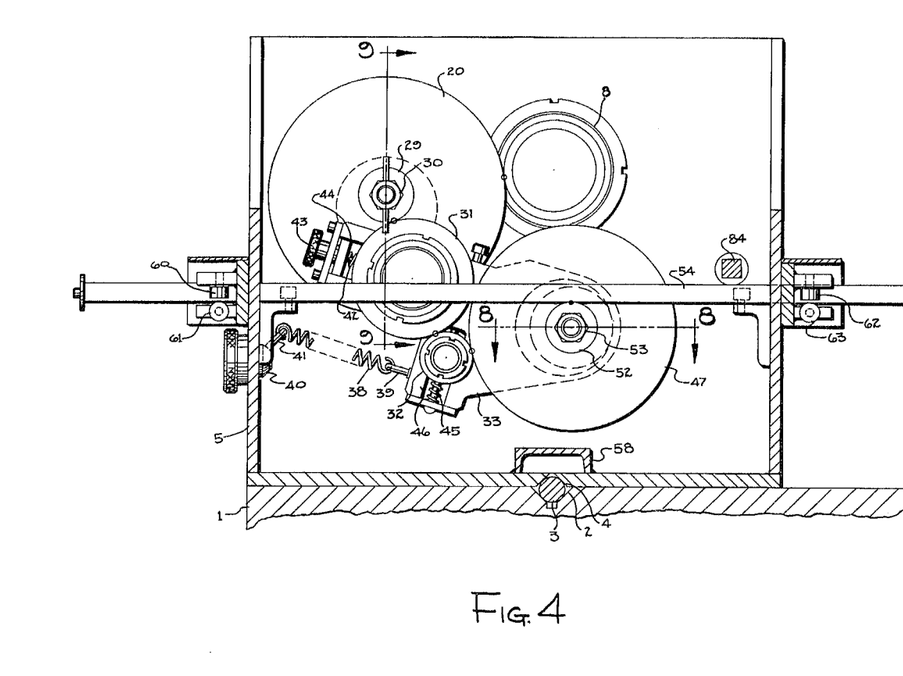
FIGURE 4 is a section taken along line 4—4 of FIGURE 3 in the direction of the arrows, as indicated.
Figure 5:
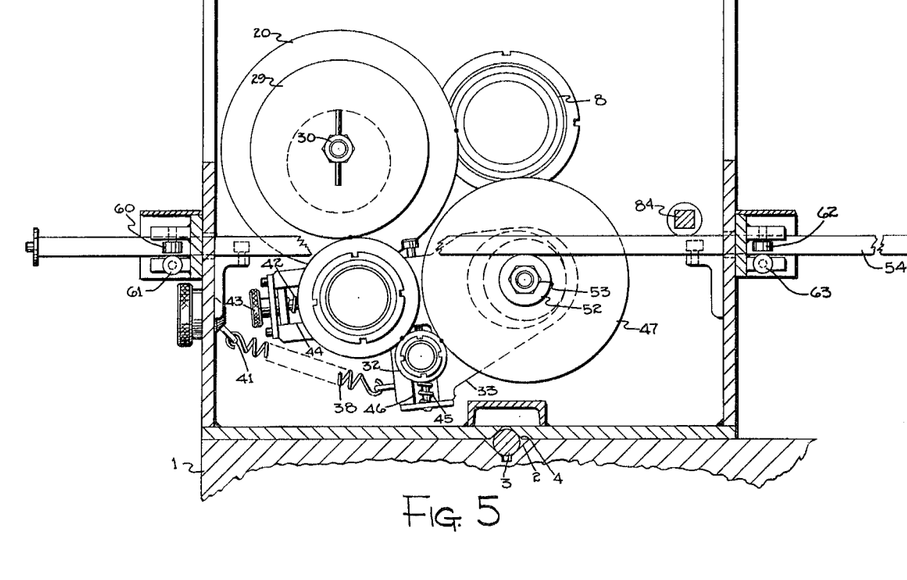
FIGURE 5 is a view similar to that of FIGURE 4 in which a modified driving relationship is shown, FIGURES 4 and 5 illustrating the extremes in angular positions occupied by the arm supporting an idler disk and forming a part of the driving connection shown therein.

As illustrated in FIGURES 4 and 5, a spring 38 is connected at one end with the arm 33 by means of a screw eye 39 and its its other end is attached to a rotatable screw anchor 40 by means of screw eye 41. The arm 33 is thus urged about its pivot point by this spring 38.

Idler disk 31 is spring urged by a spring 42 and spring control knob 43 along slide ways 44, the spring pressure being adjustable by turning the control knob 43. Likewise the idler 32 is also adjustably spring urged by means of a spring 45 along slide ways 46. The combined urging of the springs 38, 42 and 45 act to keep the idlers in adjusted frictional contact with one another as well as with the frictional disks adjacent to each of them.

In FIGURES 4 and 8, it will be noted that the idler 32 is in frictional engagement with the periphery of the disk 47 for driving the latter about its axis. The disk 47 is supported in bearings 48 mounted in cartridge 35. In this connection, it should be noted that the diameter 34 of the cartridge about which the arm 33 pivots, as well as the bore housing bearings 48 are concentric with one another but both of these are eccentric to the mounting opening 36 supporting the cartridge 35. Rotation of disk 47 transmits through key 49 to shaft 50 to which, by means of a key 51, the disk 52 is retained on the shaft, there being a retaining nut 53 for this purpose, as shown in FIGURE 8. Disk 52 is cammed upwardly against the cross bar 54 (FIGURE 4) by means of the eccentricity of the rotating axis of the shaft 50 with respect to that of the diameter 34, thus causing the disk 52 to be in frictional driving relation with the cross bar 54.

Figure 11:
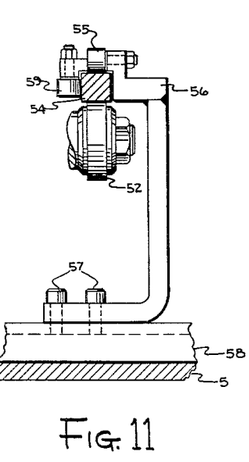
FIGURE 11 is an enlarged view partly in section as seen in the direction of line 11—11 of FIGURE 3.

Rotation of the disk 52 through frictional engagement with the cross bar 54 is converted into linear motion of the cross bar and, as viewed in FIGURE 11, the cross bar is restrained vertically against the pressure of the disk 52 by a needle bearing roller 55 mounted in the vertical support 56 and secured by means of bolts 57 to the inverted channel 58 integral with the bottom of the headstock 5. The cross bar 54 is also supported and restrained by roller 59 (FIGURE 11) as well as by rollers 60, 61, 62 and 63 (FIGURE 4). The rollers 60 and 61 and the rollers 62 and 63 are suitably mounted in respective outboard supports secured to the sides of the headstock 5.

Figures 6, 7:
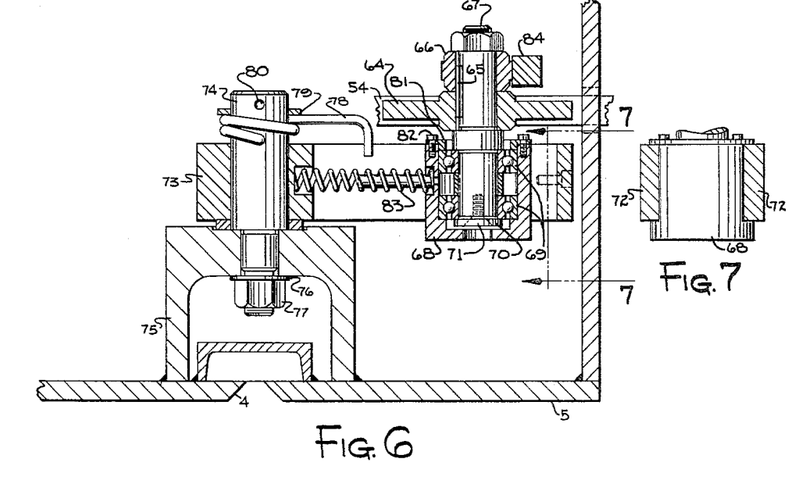
FIGURE 6 is a slightly enlarged section taken on the line 6—6 of FIGURE 3.
FIGURE 7 is a section taken along line 7—7 of FIGURE 6 in the direction of the arrows therein indicated.

Linear motion of the cross bar 54 (FIGURE 3) in friction contact with the disk 64 will impart rotary motion to this disk which, as indicated in in FIGURE 6, is keyed by means of a key 65 in common with disk 66 to shaft 67 which is journaled in a cartridge 68 by means of bearings 69. The bearings 69 are spaced apart and are held on the shaft by means of a cap 70 and screws 71.

The cartridge 68 is slidably mounted between the arms 72 of the swing arm 73 pivotally carried on post 74. The post 74 is mounted in an inverted channel shaped member 75 of the headstock by means of washer 76 and a nut 77. The swing arm 73 is positioned axially on the shaft and is urged about the post 74 by the torsional action of a coil spring 78 which is retained on the post by means of a washer 79 and a cross pin 80. To adjust the spring load to a desirable degree the shaft 74 may be turned while the nut 77 is loose until the selected loading of the spring is obtained, after which the nut is tightened on the shaft to lock it in place on the member 75. The spring 78 mounted as shown in FIGURE 6 will thus urge the disk 64 against the cross bar 54. The shaft 67 and its bearing assembly is retained in the cartridge 68 by means of a cap 81 and screws 82. A compression spring 83 having one end seated in a recess in the hub of the arm 73 and its other end seated in a recess in the cartridge 68 urges the cartridge 68 linearly between the arms 72 and hence the disk 66 into frictional driving engagement with a comparator bar 84.

Figure 14:
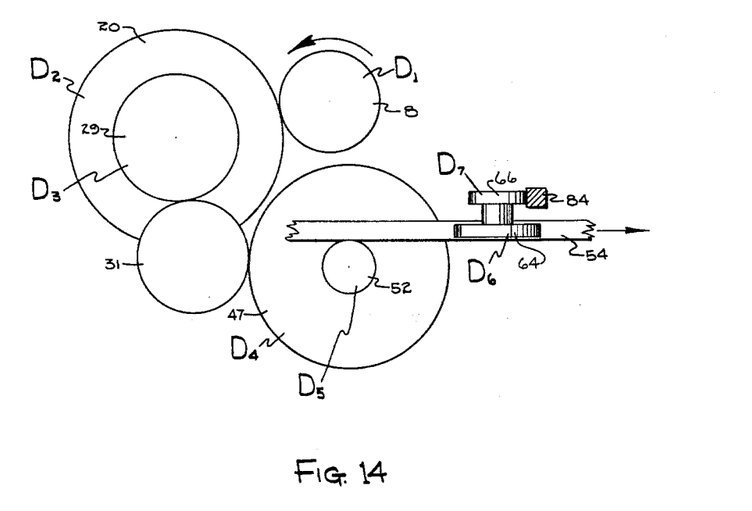
FIGURE 14 is a diagrammatic view of the apparatus showing the disk arrangement used in checking left hand leads.
Figure 15:
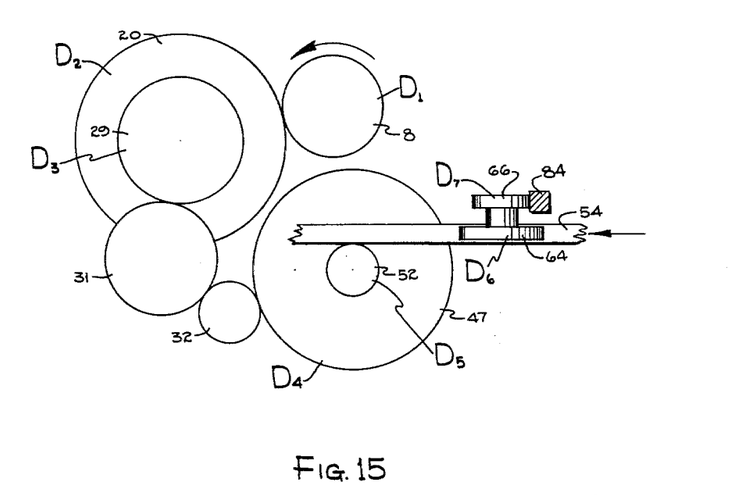
FIGURE 15 is a view similar to that of FIGURE 14 but shows the disk arrangement used in checking the right hand leads.

As illustrated in FIGURE 14, the disk drive arrangement is such that the cross bar 54 will be moved linearly to the right as in checking the lead of a left hand thread or helix. Under such conditions, the idler disk 32 may be eliminated from the drive, but in checking a right hand thread or helix, the idler disk 32 is interposed in driving relation between the disks 31 and 47, as shown in FIGURE 15.

Figure 3:
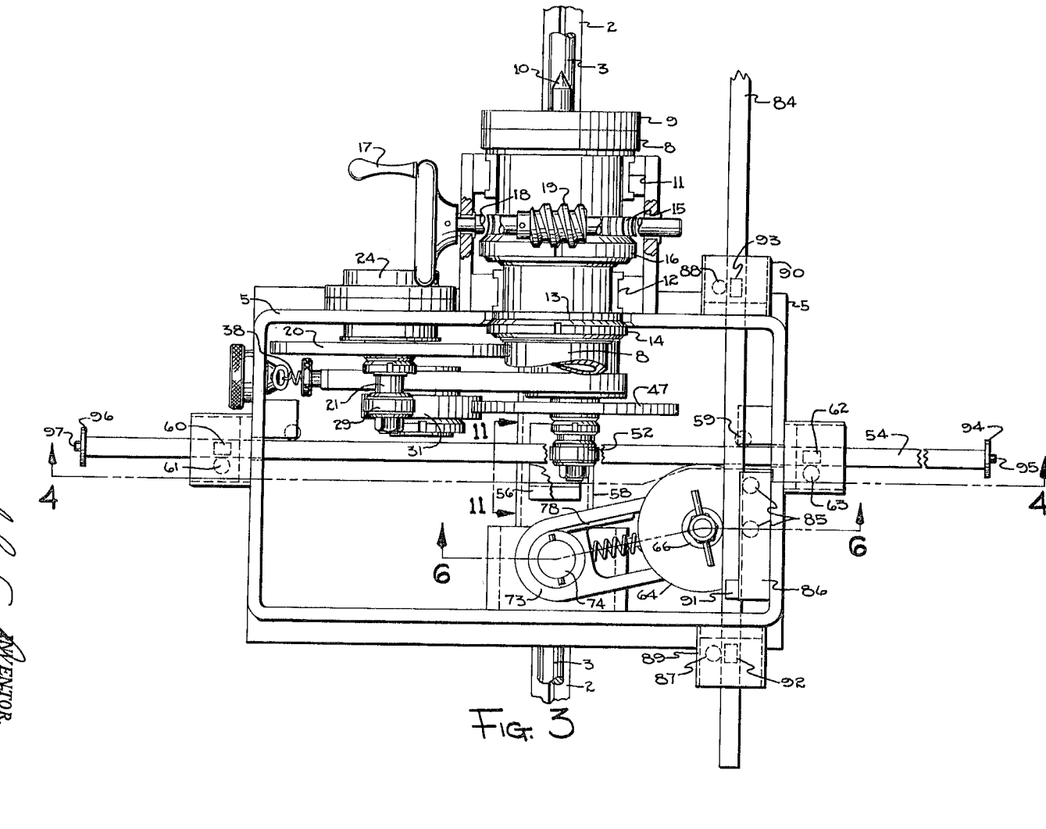
FIGURE 3 is a plan view of the headstock and associated mechanism with the cover plate removed and shows the headstock as rotated clockwise through 90° as viewed in FIGURE 2.

With the disk 66 in frictional driving contact with the comparator bar 84, rotation of this disk will transmit linear motion to the bar 84. Bar 84 is restrained against the thrust of disk 66 by means of rollers 85 rotatably carried in the holder or block 86, as illustrated in FIGURE 3, and is guided on its opposite side by contact with the rollers 87 and 88 carried in outboard supports 89 and 90, respectively, which are secured to and supported on the outside of the headstock. The comparator bar 84 is also supported and guided vertically on the top side or face by a roller 91 in block 86 and on the underside by rollers 92 and 93 in the outboard supports 89 and 90, respectively.

To limit the linear movement of the cross bar 54 in either direction, I have provided an end washer and a bolt 94 and 95, respectively, at one end and an end washer 96 and bolt 97 at its other end.

Figure 12:
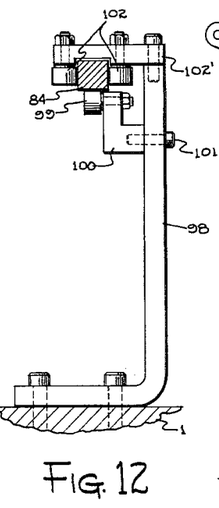
FIGURE 12 is an enlarged section as viewed along line 12—12 of FIGURE 2.
Figure 13:
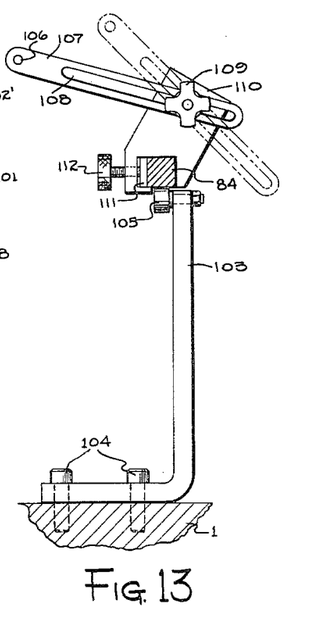
FIGURE 13 is an enlarged section as viewed along line 13—13 of FIGURE 2.

The comparator bar 84 whose direction of linear motion is in a plane intersecting the direction of linear motion of the bar 54, is supported and guided in such movement outside of the headstock, as illustrated in FIGURES 2, 12 and 13. In FIGURE 12, the comparator bar 84 is shown as supported along its bottom surface by a roller 99 rotatably mounted in a bracket 100 and secured to the support 98 by means of bolts 101. The comparator bar 84 is also guided by opposed rollers 102 engaging opposite sides of the bar, these rollers being rotatably carried in an arm 102' supported on a support 98.

In FIGURE 13, I have illustrated intermediate supports 103, two of which are shown in FIGURE 2, fastened by means of bolts 104 to the bed 1. These supports mount rollers 105 which engage the undersurface of the comparator bar to vertically support the bar while permitting linear motion of the bar in response to power transmitted to the bar by means of the disk 66.

An indicator or probe is carried at 106 on the end of an arm 107 which is provided with an elongated slot 108 and this arm is adjustably mounted and supported upon a carriage block 110 by means of a clamping hand knob 109 having a threaded shank which is threaded into the carriage block 110 through the slot 108. The carriage block 110 may be positioned on the comparator bar 84 in any one of selected positions along the bar and may be clamped in a selected position on the bar by means of a clamping plate 111 engaging one side of the bar 84 which is operable by means of a hand screw 112 carried by the carriage block. This is illustrated in detail in FIGURE 13. By such means, the probe or indicator may be adjusted so that its end will properly engage with a helical surface of the workpiece W, as illustrated in FIGURE 2.

Although I have not illustrated in the drawing any specific means to indicate or record the trueness or deviations of the helical surface with which the probe or stylus is in contact during rotation of the workpiece, it is intended that suitable means of this character of conventional type may be employed and connected either mechanically or electrically with the stylus or probe, if desired. Indications of trueness or deviations in the helical surface of the piece may, of course, be visual or audible.

Having described the construction of an embodiment of my invention, its operation will be found to be extremely simple and may be described as follows:

A workpiece W which possesses a screw thread, a screw form, a helical groove or the like and which is to be checked or tested, is placed between the aligned centers in the tailstock and headstock of the machine and, in the illustration shown in FIGURE 2, is driven by the dog D in conventional lathe style. The stylus or probe is properly adjusted to contact the helical surface to be checked and by turning the handwheel 17, the spindle and workpiece are rotated at a desired rate. This also rotates the circumferentially contacting friction disks 20, 29, idlers 31, 32 and disk 47. Rotary motion of the disks 47 and 52, the latter of which is in frictional contact with one of the surfaces of the cross bar 54, is converted into linear motion in the bar in a direction or plane intersecting the planes of the disks 47 and 52. If the idler 32 is employed in the drive as in checking right hand leads in the workpiece, as illustrated in FIGURES 4 and 15, the cross bar will be moved linearly in one direction, while in the arrangement illustrated in FIGURE 14, wherein the idler is removed from the drive and the idler 31 is in direct driving contact with the disk 47, as in testing or checking left hand leads in the workpiece, the cross bar will be moved linearly in an opposite direction. As the cross bar is moved linearly, being in frictional contact with the periphery of the friction disk 64 keyed with the friction disk 66 to the shaft 67, such linear motion of the bar will be converted into rotary motion in the disks 64 and 66. Since the periphery of the disk 66 is in frictional contact with a longitudinal surface of the comparator bar 84, under the urging of the spring 78, rotation of the disk 66 in either direction will impart linear motion to the bar 84 and propel it in a resultant direction.

Assuming the terminal end of the probe or indicator 106 is adjusted for contact under light pressure with the helical surface of a workpiece W to be checked or tested by clamping the probe support 110 in a selected starting position on the bar 84 and by adjusting and locking the arm 107 (FIGURE 13) into position, the piece W may now be rotated by turning the handwheel 17.

As pointed out above, such rotation of the workpiece W will, through the selective means provided, cause the probe to travel in timed relation with and along the rotating helical surface to be tested and will respond to the trueness and any deviations in the surface.

As stated above, the response of the probe to the condition of the surface it contacts may be indicated or even recorded through suitable conventional means, either mechanically or electrically, with which it can be operatively connected.

Figure 16:
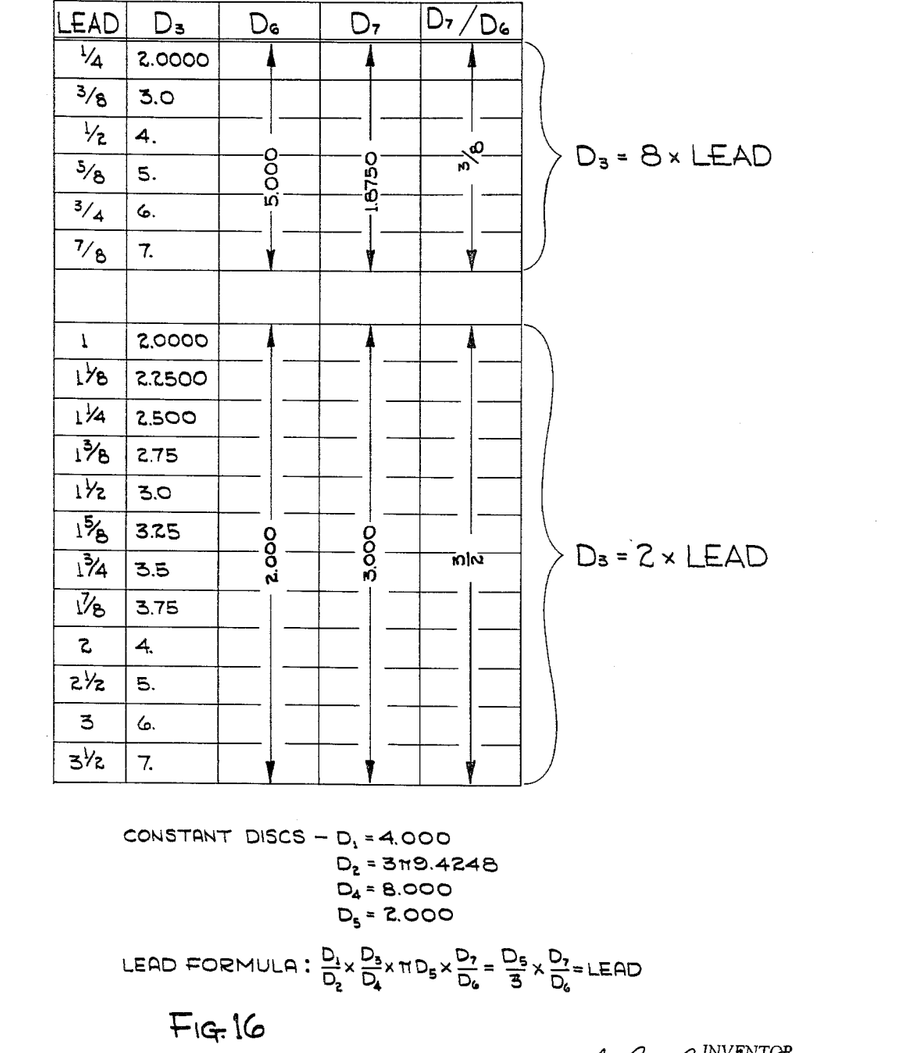
FIGURE 16 is a lead chart and formula for carrying out the selection of interchangeable friction disks employed in setting up the machine for linearly checking the leads of helical surfaces of selected workpieces.

It will be seen that by introducing between the work spindle 8 and the comparator bar 84 a proper ratio of disk diameters such as at 29, 52 and 66 (FIGURES 9, 8 and 6), and by way of example as is illustrated on the chart in FIGURE 16, the bar 84 and probe 106 will move in a proper timed relation linearly along the axis of a given workpiece to detect and check the accuracy or variations in the helical surface being checked. The adjustability of the probe support along the bar 84 will enable the operator to check separately linearly spaced apart surfaces, or a continuous check may be made by starting the probe at a point defining one end of the helical surface to be checked, and rotating the workpiece until the probe has traveled in a continuous movement to the opposite end of the workpiece.

In FIGURES 14 and 15, I have designated the several friction disks by letter identification corresponding, respectively, to the numerical identification hereinbefore employed for purposes of simplicity and clearness in referring to the chart in FIGURE 16, as follows:

| (FIGS. 14 to 16, incl.): | (FIGS. 1–13, incl.) |
|---|---|
| D1 | 8 |
| D2 | 20 |
| D3 | 29 |
| D4 | 47 |
| D5 | 52 |
| D6 | 64 |
| D7 | 66 |

By referring to FIGURE 16, it will be seen that by introducing between the work spindle 8 and the comparator bar 84 a proper selected ratio of friction disk diameters, the comparator bar and probe 106 will move linearly along the axis of the workpiece W in timed relation with the rotation of the workpiece and with the probe in contact with the surface to be checked or tested, an accurate determination of the presence or absence of trueness or deviations in the helical surface is readily made without the use of gears, tapes, racks, screws and nuts or the like, thus eliminating backlash problems.

Various changes may be made in the details of construction and arrangement of parts of the invention without departing from the spirit thereof or the scope of the appended claims.

I claim:

1. An apparatus for checking and testing the lead in a workpiece having a helical surface to be checked, comprising means supporting the workpiece for rotation, means for rotating the workpiece, transmission means driven by said workpiece rotating means, linearly movable means directly driven by said transmission means, a probe adjustably carried on said last named means for contact with the surface to be checked, said linear movement of the probe being in timed relation to the rotary movement of the workpiece, said transmission means including a plurality of disk members arranged in a driving succession, each having uninterrupted circumferential traction surfaces, a pair of comparator bars disposed for movement along intersecting planes, each of said bars having a continuous flat linear driving surface, an idler disk means in driving engagement with the said continuous flat linear surface of each of said bars whereby, in response to rotation of the workpiece, linear movement is imparted to said bars along intersecting planes to move the probe in contact with and along the surface of the rotating workpiece to be checked in timed relation thereto.

2. A lead checking apparatus comprising means for rotatably supporting a workpiece having a lead surface to be checked, including driving means actuable in driven response to rotation of the workpiece, said driving means including a plurality of rotary driving disks having smooth circumferential driving surfaces arranged in a succession, certain of said disks having preselected diameters, linearly movable means comprising a pair of comparator bar members each axially movable in intersecting planes, supporting rollers for said bar members, said bar members each having driven contact with certain of said preselected disks whereby, in direct response to rotation of the workpiece, such rotary motion is converted into linear motion of said comparator members, a probe carried by and movable with one of said comparator members in a direction parallel with the axis of rotation of the workpiece, said probe being adjustable for contact with the surface of the workpiece to be checked in timed relation to the rotation of the workpiece.

3. A lead checking apparatus comprising means for rotatably supporting a workpiece having a lead surface to be checked, including driving means actuable in response to rotation of the workpiece, said driving means including a plurality of rotary disks having smooth circumferential traction surfaces arranged in a driving succession, certain of said disks having preselected pi diameters, linearly movable means comprising a plurality of comparator bars having flat roller engaging surfaces and supported for linear movement in intersecting planes, one of said bars lying and movable in a plane substantially parallel with the axis of the workpiece, another of said bars lying and movable in a plane substantially transverse to the axis of the workpiece and having driven contact with said certain disks, additional smooth surfaced rotary disk means for moving said one of said bars in response to movement of said other of said bars, whereby, in response to rotation of the workpiece, such rotary motion is converted into linear motion of said comparator bars, a probe carried by and movable with one of said bars for contact with the surface of the workpiece to be checked in timed relation to the rotation of the workpiece.

4. A lead checking apparatus comprising means for rotatably supporting a workpiece having a lead surface to be checked, including driving means actuable in response to rotation of the workpiece, said driving means including a plurality of rotary disks having uninterrupted circumferential driving surfaces and arranged in a driving succession, certain of said disks having preselected pi diameters compatible with the lead of the surface to be checked, linearly movable comparator bars supported for linear movement in intersecting planes, each of said bars being supported for rolling engagement with said circumferential surfaces and driven by said certain disks whereby, in response to rotation of the workpiece, such rotary motion is converted into linear motion of said comparator bars, a probe movable with one of said bars for contact with the surface of the workpiece to be checked in direct timed relation to the rotation of the workpiece.

5. An apparatus for continuous and uninterrupted checking and testing throughout the extent of the lead in a workpiece having a helical surface to be checked, comprising means supporting the workpiece for rotation through a plurality of successive revolutions, means for rotating said workpiece, transmission means driven by said workpiece rotating means, linearly movable means directly driven by said transmission means, a probe adjustably carried on said last named means for contact with the surface to be checked, said linear movement of the probe being in timed relation to the rotary movement of the workpiece, said transmission means including a plurality of disk members arranged in a driving succession, each having uninterrupted circumferential traction surfaces, a pair of comparator bars disposed for movement along intersecting planes, each of said bars having a continuous flat linear driving surface, an idler disk means in driving engagement with the said continuous flat linear surface of each of said bars whereby, in response to rotation of the workpiece, linear movement is imparted to said bars along intersecting planes to move the probe in contact with and along the surface of the rotating workpiece to be checked in timed relation thereto.

References Cited by the Examiner

UNITED STATES PATENTS

| 1,667,109 | 4/1928 | Garlent | 22—179.5 X |
| 1,898,084 | 2/1933 | Drader | 33—179.5 |
| 2,602,236 | 7/1952 | Muller | 33—179.53 |

LOUIS R. PRINCE, *Primary Examiner.*

LEONARD FORMAN, ISAAC LISANN, *Examiners.*